US012667517B1

(12) United States Patent
Liu et al.

(10) Patent No.: US 12,667,517 B1
(45) Date of Patent: Jun. 30, 2026

(54) SYSTEM, APPARATUS, AND METHOD FOR PROVIDING A SEXUAL STIMULATION DEVICE

(71) Applicant: HYTTO PTE. LTD, Singapore (SG)

(72) Inventors: Dan Liu, Guangzhou (CN); Jilin Qiu, Guangzhou (CN); Peisen Wu, Guangzhou (CN)

(73) Assignee: HYTTO PTE. LTD, Singapore (SG)

( * ) Notice: Subject to any disclaimer, the term of this patent is extended or adjusted under 35 U.S.C. 154(b) by 0 days.

(21) Appl. No.: 19/006,668

(22) Filed: Dec. 31, 2024

(51) Int. Cl.
*A61H 19/00* (2006.01)
*A61H 23/00* (2006.01)
*A61H 23/02* (2006.01)

(52) U.S. Cl.
CPC .......... *A61H 19/44* (2013.01); *A61H 23/006* (2013.01); *A61H 23/0254* (2013.01); *A61H 2201/0157* (2013.01); *A61H 2201/1454* (2013.01); *A61H 2201/149* (2013.01); *A61H 2201/5097* (2013.01)

(58) Field of Classification Search
CPC ........ A61H 19/00–50; A61H 23/00–06; A61H 2023/002; A61H 1/006; A61H 1/008
USPC .......................................................... 600/38
See application file for complete search history.

(56) References Cited

U.S. PATENT DOCUMENTS

| | | | | |
|---|---|---|---|---|
| 2,957,474 A * | 10/1960 | Bates | A61H 23/0254 601/135 |
| 6,190,307 B1 * | 2/2001 | Tsai | A61H 19/34 601/51 |
| 11,471,371 B2 * | 10/2022 | Topolev | A61H 23/0263 |
| 2004/0186344 A1 * | 9/2004 | Jannuzzi | A61H 21/00 600/38 |
| 2016/0354277 A1 * | 12/2016 | Fima | A61H 19/44 |
| 2016/0354278 A1 * | 12/2016 | Cambridge | A61H 19/44 |
| 2021/0228437 A1 * | 7/2021 | Haddock | A61H 9/0057 |

* cited by examiner

*Primary Examiner* — Paige Kathleen Bugg
(74) *Attorney, Agent, or Firm* — Keefe IP Law, PLLC

(57) ABSTRACT

A curvilinear reciprocating device for sexual stimulation is disclosed. The curvilinear reciprocating device has a main body; a curved stimulation member, which is configured to stimulate an erogenous zone of a human body, including a proximal end portion and a distal end portion and wherein the proximal end portion is coupled to the main body; an actuator at least partially disposed within the main body and configured to actuate the distal end portion to move from a first position away from the main body to a second position that is closer to the main body than the first position; and a rebound mechanism configured to rebound the distal end portion from the second position to the first position, thereby causing the distal end portion to reciprocate in a curvy trajectory between the first position and the second position.

21 Claims, 12 Drawing Sheets

SYSTEM, APPARATUS, AND METHOD FOR PROVIDING A SEXUAL STIMULATION DEVICE

FIELD OF THE INVENTION

The present disclosure generally relates to a system, apparatus, and method for providing a device, and more particularly to a system, apparatus, and method for providing a sexual stimulation device.

BACKGROUND OF THE INVENTION

Adult devices such as adult toys can be used to provide sexual stimulation to a user. For example, some adult toys provide sexual stimulation of female or male erogenous zones.

Adult toys such as toys that exist for the stimulation of female or male genitalia often include movable stimulating members. Such movable stimulating members can be driven by motors disposed in the adult toys. Significant resistance can be applied to the stimulating member during use, which can cause the motors driving the stimulating members to become blocked, jammed, or otherwise inoperative.

Accordingly, a need in the art exists for an efficient technique and apparatus for providing effective sexual stimulation such as of female or male genitalia without causing malfunction of a motor of an adult toy.

The exemplary disclosed system and method are directed to overcoming one or more of the shortcomings set forth above and/or other deficiencies in existing technology.

SUMMARY OF THE INVENTION

In one exemplary aspect, the present disclosure is directed to a curvilinear reciprocating device for sexual stimulation. The curvilinear reciprocating device includes a main body; a curved stimulation member, which is configured to stimulate an erogenous zone of a human body, including a proximal end portion and a distal end portion and wherein the proximal end portion is coupled to the main body; an actuator at least partially disposed within the main body and configured to actuate the distal end portion to move from a first position away from the main body to a second position that is closer to the main body than the first position; and a rebound mechanism configured to rebound the distal end portion from the second position to the first position, thereby causing the distal end portion to reciprocate in a curvy trajectory between the first position and the second position.

In another aspect, the present disclosure is directed to a reciprocating device for sexual stimulation. The reciprocating device for sexual stimulation includes a main body; a stimulation member, which is configured to stimulate an erogenous zone of a human body, including a proximal end portion and a distal end portion and wherein the proximal end portion is coupled to the main body; an actuator at least partially disposed within the main body and configured to actuate the distal end portion to move from a first position away from the main body to a second position that is closer to the main body than the first position; and a rebound mechanism configured to rebound the distal end portion from the second position to the first position, thereby causing the distal end portion to reciprocate in a linear trajectory between the first position and the second position.

DETAILED DESCRIPTION AND INDUSTRIAL APPLICABILITY

Figure 1:
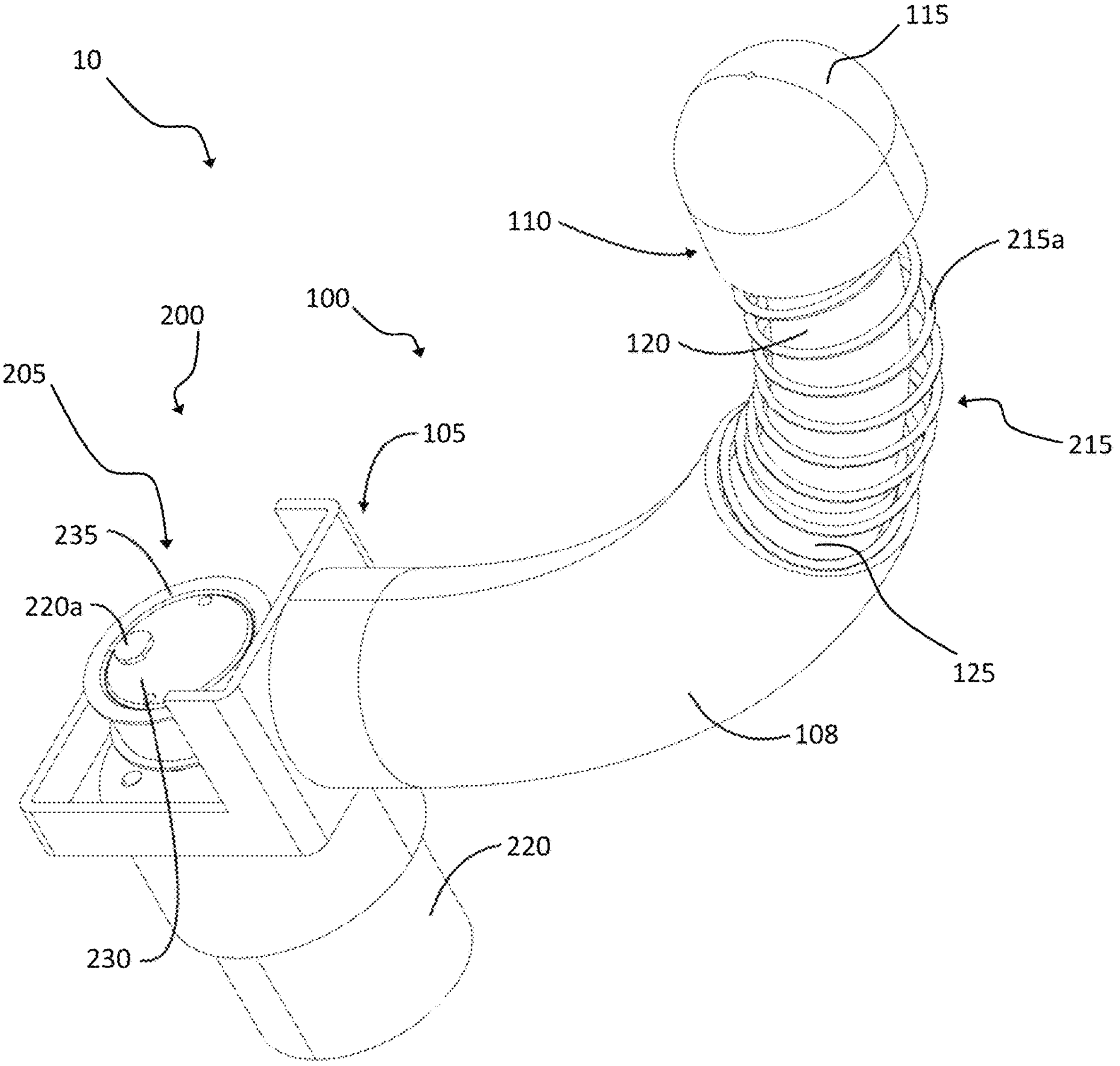
FIG. 1 is a perspective illustration of an exemplary system of the present invention.
Figure 2:
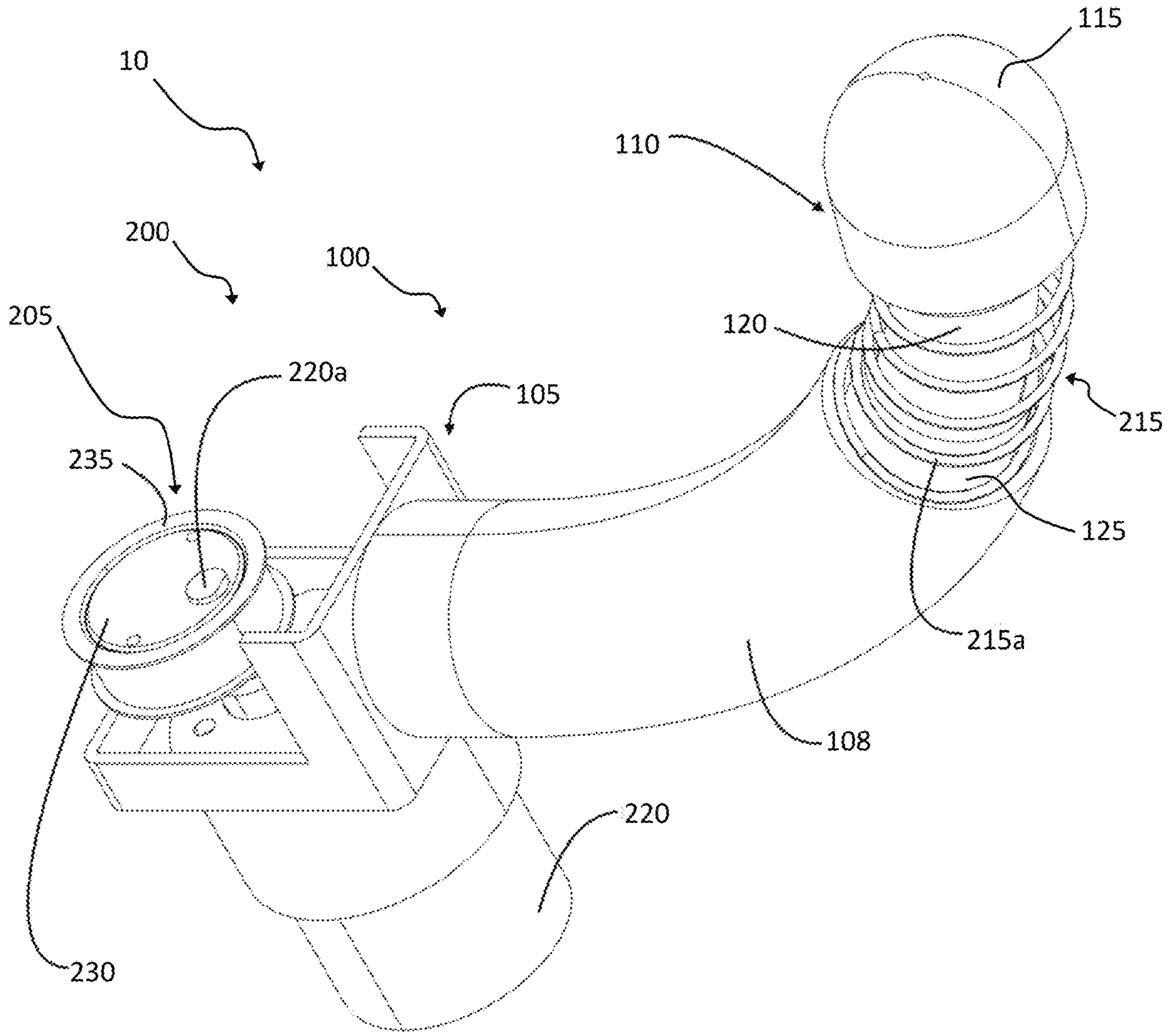
FIG. 2 is another perspective illustration of the exemplary system of FIG. 1.

FIGS. 1 through 4 illustrate a first exemplary embodiment (e.g., an apparatus 10) of the exemplary disclosed system, apparatus, and method. Apparatus 10 may be a reciprocating apparatus for an adult toy such as an accessory used for erotic stimulation (e.g., a sex aid or "sex toy"). Apparatus 10 may be a sexual stimulation device that may be used by a female user and/or a male user. For example, apparatus 10 may be a curved dildo or a male masturbator. In at least some exemplary embodiments, apparatus 10 may be a curvilinear-reciprocating device for sexual stimulation. Apparatus 10 may provide for reciprocal stimulation using a curved dildo.

Apparatus 10 may include a structural assembly 100 and an actuator such as a reciprocating assembly 200. Reciprocating assembly 200 may provide for reciprocation of components of structural assembly 100 as described herein. For example, reciprocating assembly 200 may provide for curvilinear reciprocation of components of structural assembly 100.

Structural assembly 100 may include a main body 105, a guide member 108, and a stimulation member 110. Stimulation member 110 may be reciprocated relative to main body 105 and guide member 108 based on an operation of reciprocating assembly 200 as described herein. Structural assembly 100 may be formed from any suitable structural material such as, for example, plastic (e.g., thermoplastic polymeric material), composite material, metal material, and/or any other suitable structural material. For example, structural assembly 100 may be formed from acrylonitrile butadiene styrene (ABS) material, polycarbonate material, PPS material, and/or any other suitable structural material.

Main body 105 and guide member 108 may house components of reciprocating assembly 200 and may movably support stimulation member 110. For example, main body 105 may house a portion of the exemplary disclosed motor of reciprocating assembly 200, and guide member 108 may house the exemplary disclosed connecting member of reciprocating assembly 200. Main body 105 and guide member

108 may be integrally formed with each other and/or attached via any suitable technique such as mechanical fasteners, adhesive, welding (e.g., plastic welding), and/or any other suitable technique. Main body 105 and guide member 108 may comprise a built-up assembly of wall members (e.g., plastic wall members) for example as illustrated in FIGS. 1 through 4.

Figure 3:
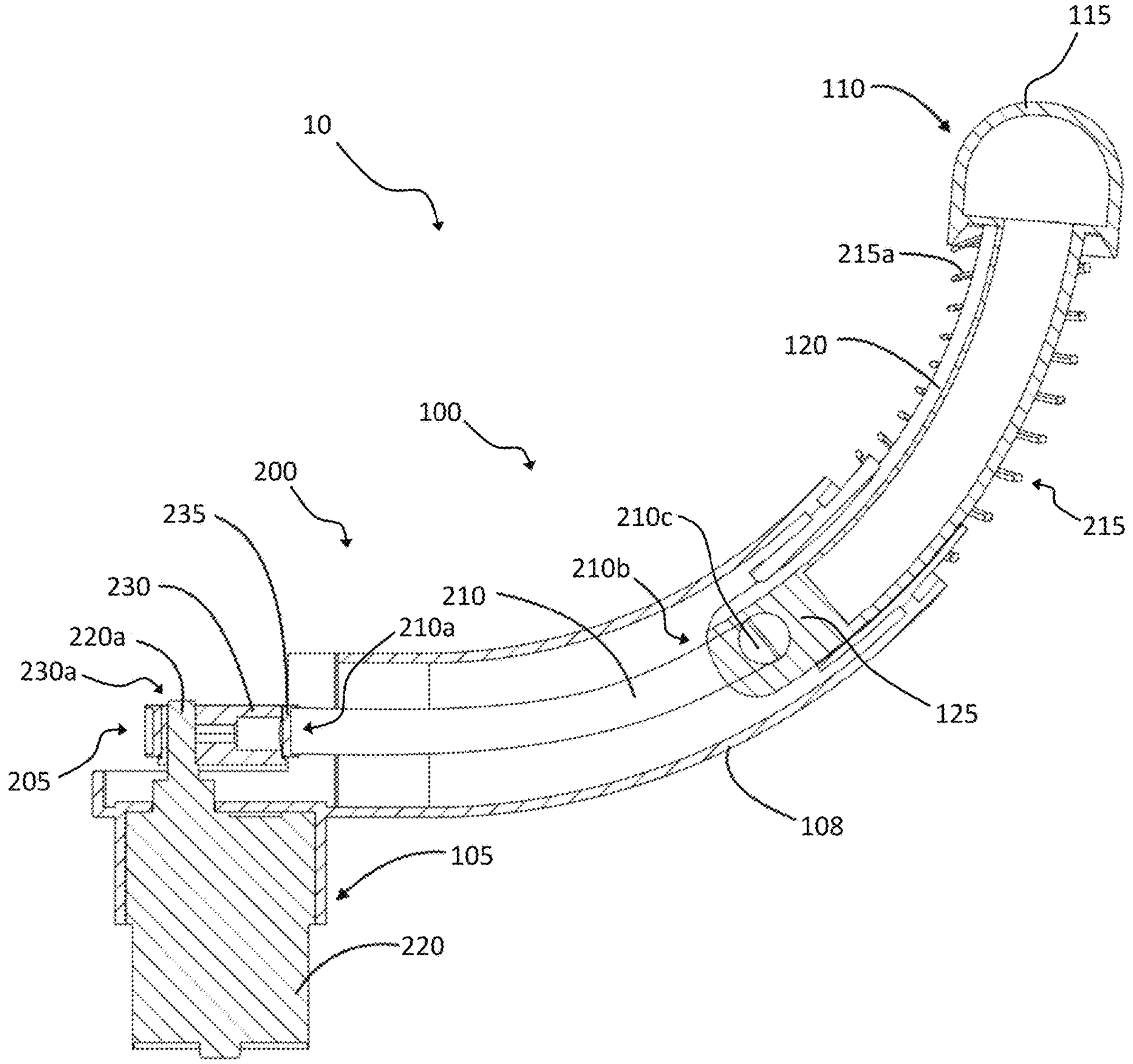
FIG. 3 is a sectional illustration of the exemplary system of FIG. 1.
Figure 4:
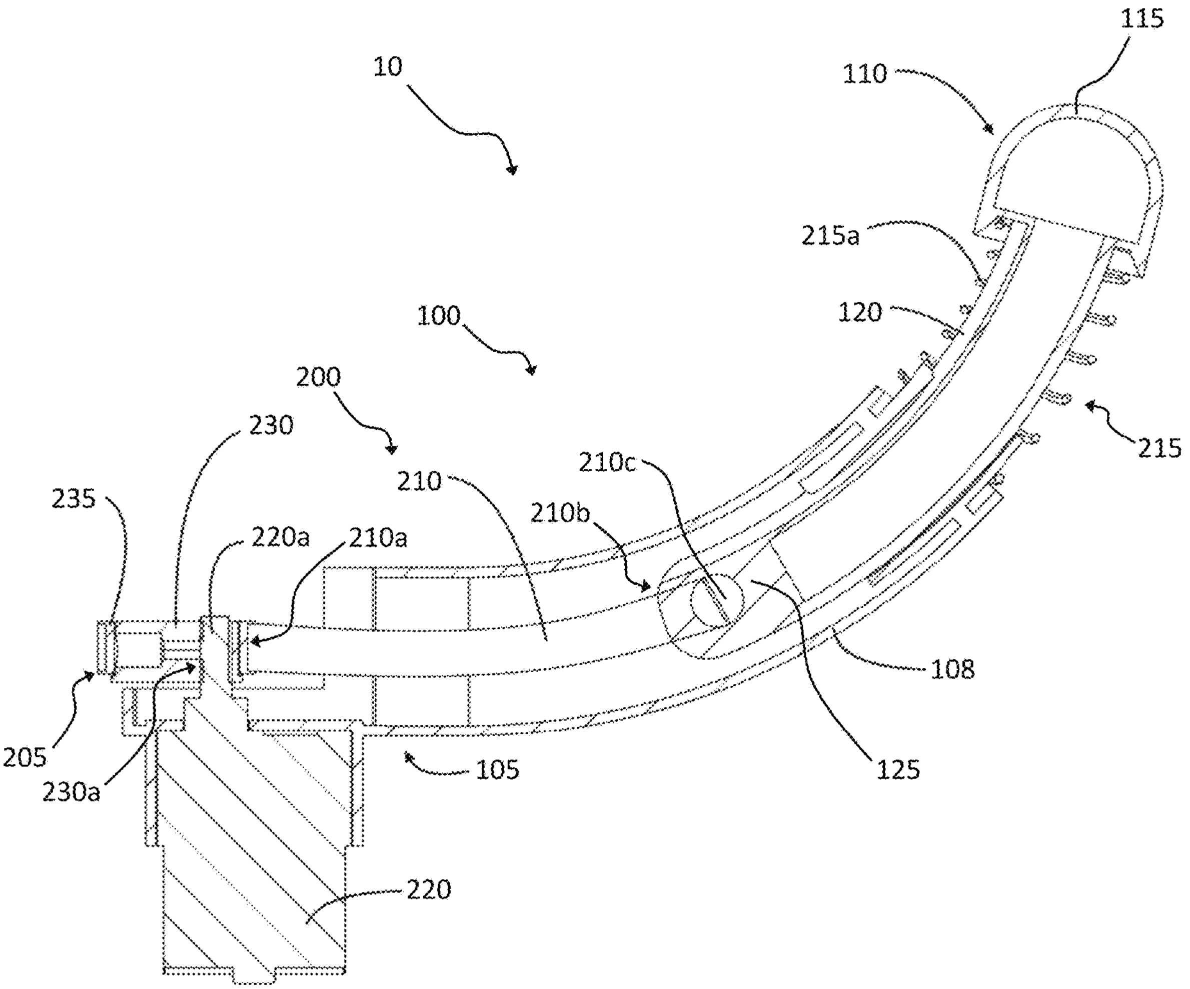
FIG. 4 is another sectional illustration of the exemplary system of FIG. 1.

Guide member 108 may be formed as a curved sleeve that may be configured to movably receive and support stimulation member 110. Stimulation member 110 may be removably received within guide member 108 (e.g., within guide member 108 formed as a curved sleeve). Guide member 108 may have a curvilinear shape (e.g., curved or arcuate shape). For example, guide member 108 may be a hollow, curvilinear member in which correspondingly shaped stimulation member 110 is movably received and guided. Guide member 108 may be configured to cause stimulation member 110 to move along a curved axis (e.g., curvilinear axis) as illustrated in FIGS. 3 and 4.

Stimulation member 110 may be structurally formed generally similarly to how base member 105 and guide member 108 are formed, and may be formed from similar materials as described above. Stimulation member 110 may include a distal end portion 115 and a linkage portion 120 having a proximal end portion 125. Distal end portion 115 may be formed as a head (e.g., a dildo head). Distal end portion 115 may serve as a stimulation portion. Stimulation member 110 may have at least one replaceable stimulation portion. For example, distal end portion 115 may be a replaceable stimulation portion that may be removably attached to linkage portion 120. For example, an interior surface of the wall forming distal end portion 115 and an exterior surface of an end portion of the wall forming linkage portion 120 may include corresponding threading, fastening portions (e.g., snap-fit or press-fit components), magnetic components, adhesive, hook and loop fastener components, and/or any other suitable fasteners to provide for removable attachment of distal end portion 115 and linkage portion 120. Linkage portion 120 may have an outer diameter (e.g., exterior diameter) that may be less than an inner diameter (e.g., interior diameter) of distal end portion 115 that may be a stimulation portion. In at least some exemplary embodiments, the entire stimulation member 110 (e.g., or distal end portion 115 and linkage portion 120) may serve as a replaceable stimulation member (e.g., a replaceable dildo or male masturbator).

Proximal end portion 125 may be coupled to main body 105 and/or reciprocating assembly 200 at least partially disposed in main body 105 (e.g., via the exemplary disclosed connecting member of reciprocating assembly 200). Linkage portion 120 may be a curved linkage portion that may be formed with a curvature corresponding to guide member 108 formed as a curved sleeve. Linkage portion 120 may be configured to be inserted in (e.g., received in) guide member 108 (e.g., the curved sleeve formed by guide member 108). Linkage portion 120 may be configured to be operably rotated within guide member 108 (e.g., the exemplary disclosed sleeve) relative to guide member 108 and main body 105. For example, linkage portion 120 may be operably rotated along the exemplary disclosed curved axis and/or rotated laterally (e.g., transversely rotated or rotated about its own longitudinal axis within guide member 108). Stimulation member 110 may thereby be a curved stimulation member configured to stimulate an erogenous zone of a human body such as, for example, a vagina of a female user (e.g., or a penis of a male user). For example, stimulation member 110 may thereby be a curved dildo, male masturbator, or similar adult toy.

Reciprocating assembly 200 may be an actuator including an actuator assembly 205, a connecting member 210, and a rebound mechanism 215. Connecting member 210 may be disposed within guide member 108 and connected (e.g., attached) between actuator assembly 205 (e.g., and/or main body 105) and stimulation member 110. Linkage portion 120 may pass through a component of rebound mechanism 215 for example as described below.

Actuator assembly 205 may be disposed at least partially within main body 105 for example as illustrated in FIGS. 1 through 4. Actuator assembly 205 may include a driver such as a motor 220 that may be powered by a power source (e.g., a power source 225 as illustrated in the exemplary disclosed adult toy of FIG. 10), an eccentric wheel 230, and a bearing 235. Motor 220 may be powered by power source 225 and may drive eccentric wheel 230. Bearing 235 may be operably attached to eccentric wheel 230.

Motor 220 may be any other suitable device for driving components of reciprocating assembly 200. For example, motor 220 may be any suitable electric motor. Motor 220 may be a server motor, a stepper motor, a brushless motor, and/or any other suitable type of motor. Motor 220 may be any suitable vibration motor or haptic motor such as, for example, a mini vibrator motor. Motor 220 may be a low voltage motor. Motor 220 may be a pager motor or a coin vibration motor. Motor 220 may be a linear resonant actuator or an eccentric rotating mass vibration motor. Motor 220 may be a reversible electric motor (e.g., a reversible electric motor) and/or a unidirectional motor (e.g., a one-way motor).

Power source 225 may be any suitable power source such as, for example, a battery. For example, power source 225 may be a rechargeable lithium-ion battery externally connectable to a power source (e.g., an electrical outlet, external battery, and/or any other suitable power source) via a charging contact (e.g., a magnetic charging contact). In at least some exemplary embodiments, power source 225 may be a polymer lithium battery. Power source 225 may also be a nickel-metal hydride battery, an ultracapacitor battery, a lead-acid battery, a nickel cadmium battery, or any other suitable power source.

Eccentric wheel 230 may be driven by motor 220. Eccentric wheel 230 may be for example a metal component (e.g., steel) that may be driven via an operation of motor 220. Eccentric wheel 230 may include a shaft aperture such as a shaft hole **230*a* that may be configured to connect to (e.g., receive) an output shaft 220*a* of motor 220. For example, output shaft 220*a* may be received in shaft hole 230*a* of eccentric wheel 230. Eccentric rotation of eccentric wheel 230 about output shaft 220*a* may convert rotary motion of output shaft 220*a* into reciprocating motion for driving connecting member 210 and stimulation member 110. Any other suitable component or device for converting rotary motion of output shaft 220*a* into reciprocating motion of connecting member 210 and stimulation member 110** may also be used such as, for example, a cam assembly, a crank mechanism (e.g., as described below), and/or any other suitable device.

Bearing 235 may be any suitable component for attaching connecting member 210 to actuator assembly 205. Bearing 235 may be formed from similar material as eccentric wheel 230. In at least some exemplary embodiments, bearing 235 may be configured to sleeve (e.g., form a sleeve) about eccentric wheel 230. For example, bearing 235 may be a fixed or rotatable bearing that is fixedly or rotatably supported by eccentric wheel 230 (e.g., bearing 235 may be fixed or rotatable relative to eccentric wheel 230).

Connecting member 210 may be a flexible connecting member that may be formed from any suitable elastic and/or flexible material. For example, connecting member 210 may be formed from material such as elastomeric material, natural or synthetic rubber material, and/or any other suitable flexible material, for example, a chain. In at least some exemplary embodiments, connecting member 210 may be a deformable band. Connecting member 210 may include a first end portion 210*a* and a second end portion 210*b*. First end portion 210*a* may be a portion of connecting member 210 configured to wrap around an outside lateral wall of bearing 235. Second end portion 210*b* may be connected to proximal end portion 125 of stimulation member 110 (e.g., of linkage portion 120). For example, second end portion 210*b* of connecting member 210 may be fastened to proximal end portion 125 of stimulation member 110 (e.g., of linkage portion 120) via a fastener 210*c* (e.g., such as a bolt, screw, or any other suitable mechanical fastener), adhesive, welding, and/or any other suitable attachment technique for example as described herein. Connecting member 210 being attached to stimulation member 110 (e.g., of linkage portion 120) may retain stimulation member 110 in guide member 108 as stimulation member 110 is caused to reciprocate relative to guide member 108 and main body 105 via an operation of reciprocating assembly 200. In at least some exemplary embodiments, motor 220 of reciprocating assembly 200 (e.g., and/or main body 105) may be coupled to linkage portion 120 by connecting member 210 that may serve as a deformable linkage passing through guide member 108 (e.g., the exemplary disclosed sleeve). In cases involving significant resistance during a use of the exemplary disclosed apparatus, flexible connecting member 210 may provide for motor 220 to not be blocked or jammed.

Rebound mechanism 215 may be any suitable biasing component for urging or biasing linkage portion 120 and distal end portion 115 away from guide member 108 and main body 105. Rebound mechanism 215 may be any suitable biasing member such as, for example, an elastic or flexible member. Rebound mechanism 215 may be a spring, an elastomeric or rubber member, or any other suitable material or member for biasing linkage portion 120 and distal end portion 115 away from guide member 108 and main body 105. Rebound mechanism 215 may include (e.g., may or include or may be) a coil spring 215*a*. In at least some exemplary embodiments, rebound mechanism 215 may be a metal coil spring (e.g., a stainless steel spring) or a spring formed from any other suitable material for deforming to store potential energy. Linkage portion 120 that may be a curved linkage portion may be configured to be received in rebound mechanism 215. For example, linkage portion 120 may be configured to pass through coil spring 215*a* of rebound mechanism 215 for example as illustrated in FIGS. 1 through 4. After linkage portion 120 is inserted into rebound mechanism 215, both linkage portion 120 and rebound mechanism 215 may be inserted in guide member 108. Rebound mechanism 215 may be disposed and maintained in place between distal end portion 115 and an end portion of guide member 108 for example as illustrated in FIGS. 3 and 4. Connecting member 210 being attached to linkage portion 120 and thereby retaining stimulation member 110 in guide member 108 may also serve to maintain rebound mechanism 215 in place between distal end portion 115 and guide member 108 (e.g., and main body 105). Rebound mechanism 215 may provide a rebounding action of stimulation member 110 for example as described further below.

In at least some exemplary embodiments, rebound mechanism 215 may comprise a plurality of magnetic components. For example, one or more coil springs 215*a* may be configured as magnetic components that may create repulsive force (e.g., repulsive magnetic force) between them. This repulsive magnetic force may provide the exemplary disclosed rebounding action described below (e.g., similar to the exemplary disclosed rebounding action provided by coil spring 215*a* described below).

Figure 5A:
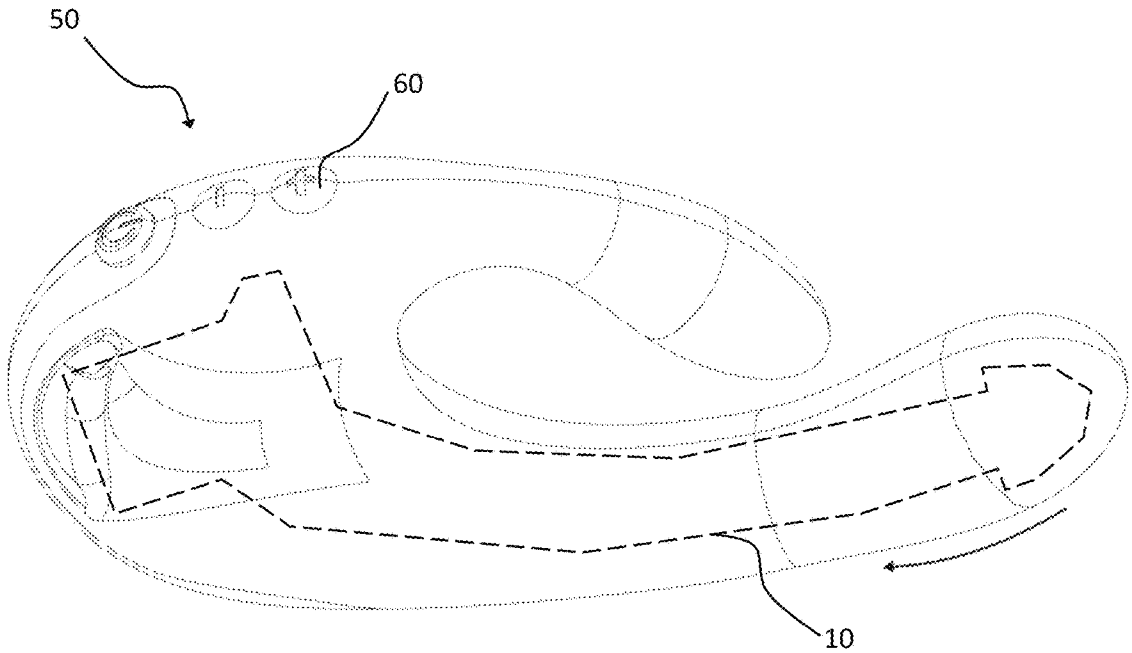
FIG. 5A is a perspective illustration of an exemplary system of the present invention.
Figure 5B:
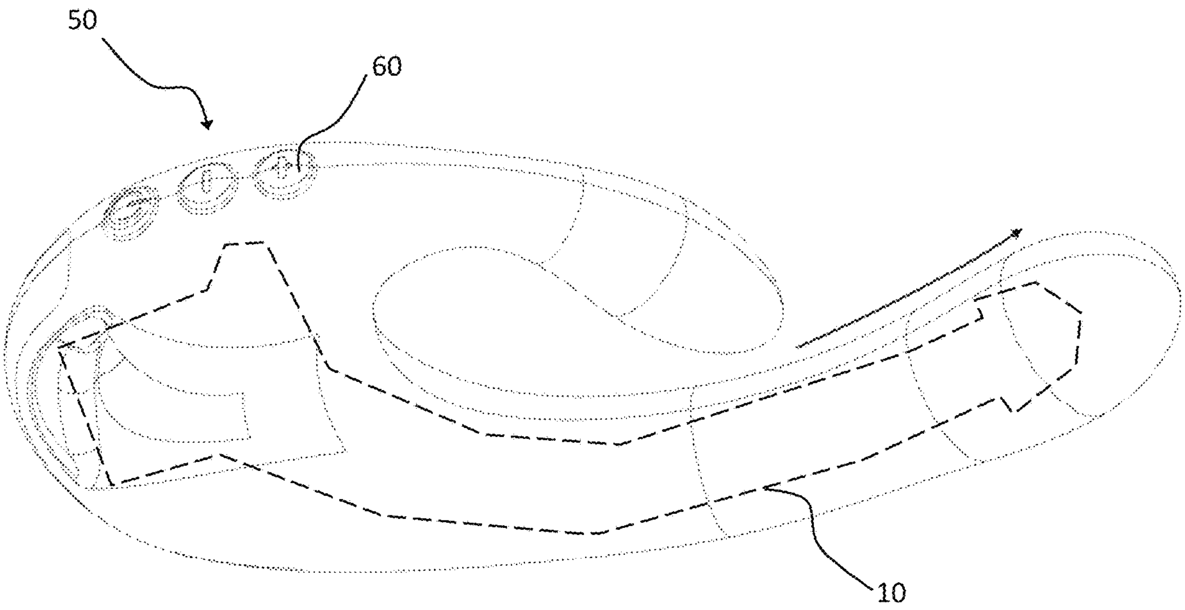
FIG. 5B is another perspective illustration of the exemplary system of FIG. 5A.

Apparatus 10 may be included in any suitable adult toy. For example, apparatus 10 may be included in an adult toy 50 for example as illustrated in FIGS. 5A and 5B, and may operate to cause a reciprocating action in adult toy 50. The other embodiments of the exemplary disclosed apparatus described below may alternatively be included in adult toy 50. Apparatus 10 (e.g., or the other embodiments of the exemplary disclosed apparatus described below) may also be included in the exemplary disclosed accessories (e.g., adult toys) described below regarding FIGS. 11 and 12).

Figure 6:
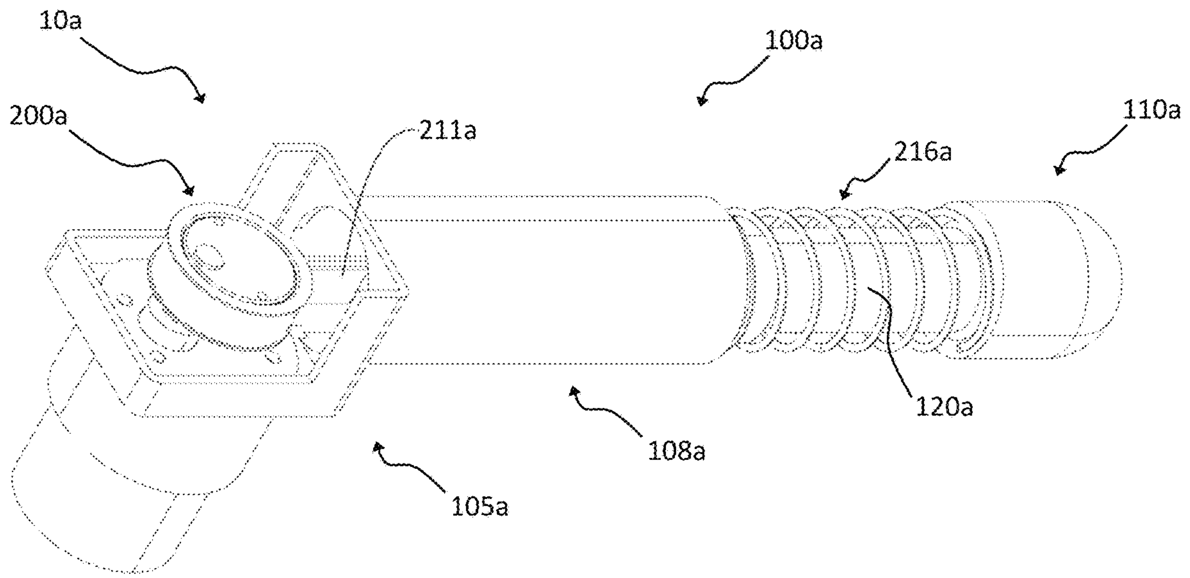
FIG. 6 is a perspective illustration of an exemplary system of the present invention.
Figure 7:
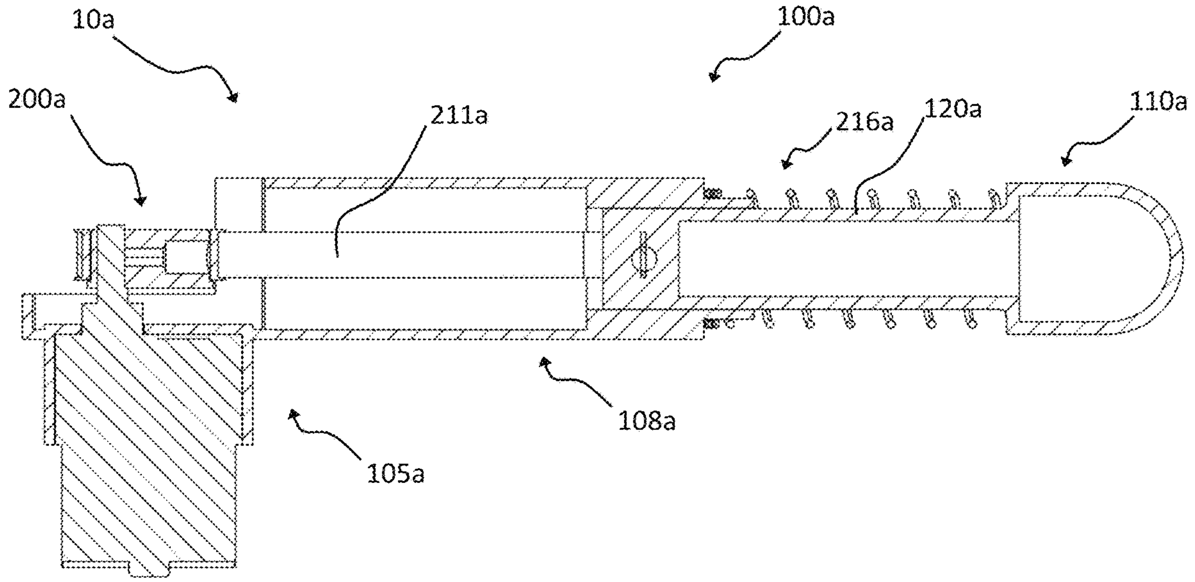
FIG. 7 is a sectional illustration of the exemplary system of FIG. 6.

FIGS. 6 and 7 illustrate another exemplary embodiment of the exemplary disclosed apparatus. An apparatus 10*a* may be utilized in linear reciprocating stimulation devices (e.g., linear reciprocating adult toys). Apparatus 10*a* may include a structural assembly 100*a* that may be generally similar to structural assembly 100 and a reciprocating assembly 200*a* that may be generally similar to reciprocating assembly 200. Structural assembly 100*a* may include a main body 105*a*, a guide member 108*a*, and a stimulation member 110*a* having a linkage portion 120*a* that may be generally similar, respectively, to main body 105, guide member 108, and stimulation member 110 having linkage portion 120. Reciprocating assembly 200*a* may include a connecting member 211*a* that may be similar to connecting member 210 and a rebound mechanism 216*a* that may be similar to rebound mechanism 215.

Guide member 108*a* and linkage portion 120*a* may be configured as substantially straight (e.g., linear) components. For example, linkage portion 120*a* may be a substantially straight linkage portion that may be received in guide member 108*a* similar to as described above regarding linkage portion 120 and guide member 108. Stimulation member 110*a* may thereby be a relatively straight stimulation member having a relatively straight linkage portion 120*a* that may reciprocate with relatively straight linear motion relative to relatively straight guide member 108*a*.

Figure 8:
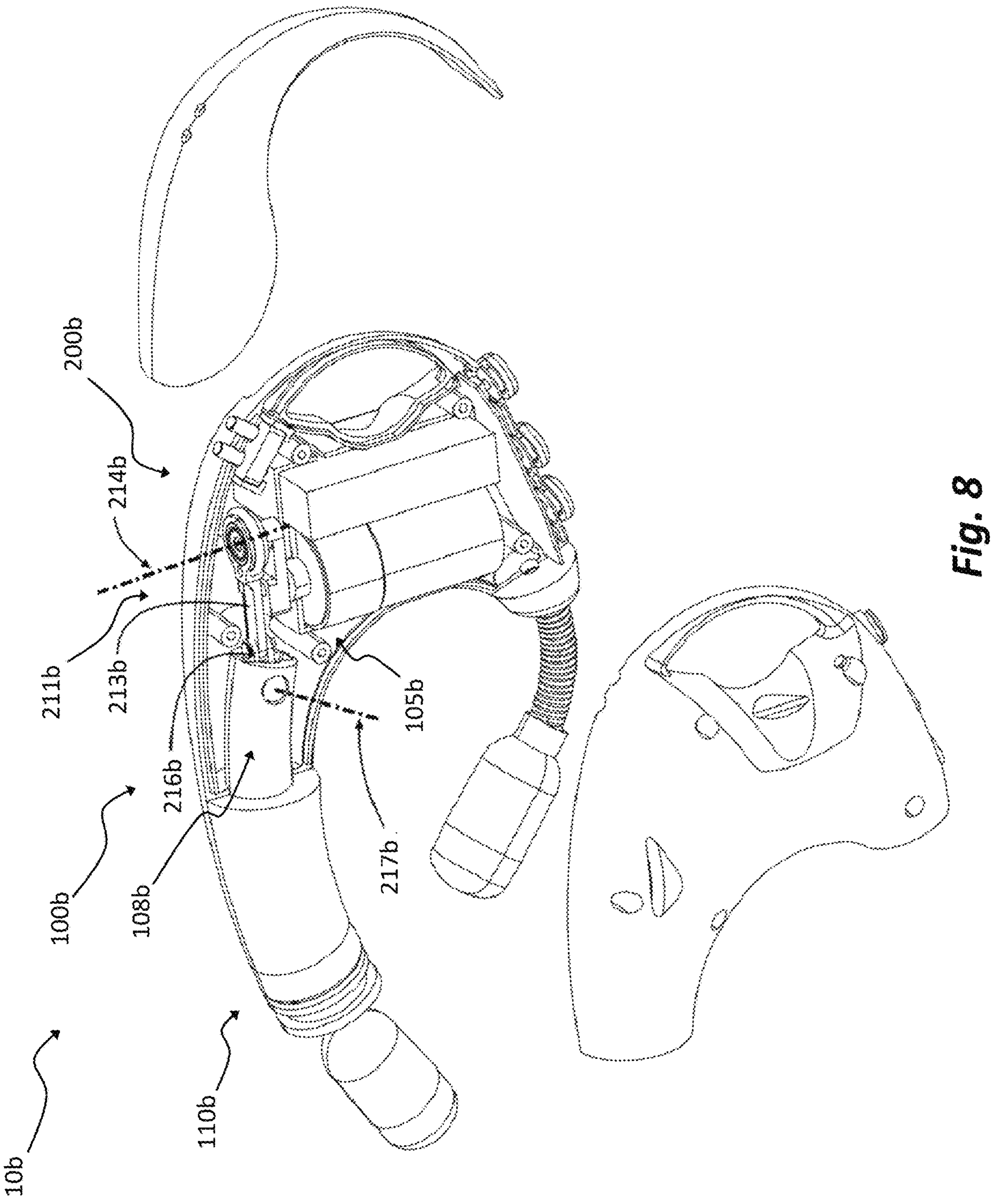
FIG. 8 is an exploded perspective illustration of another exemplary system of the present invention.

FIG. 8 illustrates another exemplary embodiment of the exemplary disclosed apparatus. An apparatus 10*b* may include a structural assembly 100*b* that may be generally similar to structural assembly 100 and a reciprocating assembly 200*b* that may be generally similar to reciprocating assembly 200. Structural assembly 100*b* may include a main body 105*b*, a guide member 108*b*, and a stimulation member 110*b* that may be generally similar to main body 105, guide member 108, and stimulation member 110, respectively. Reciprocating assembly 200*b* may include a connecting member assembly 211*b* that may include a plurality of multi-connecting rods. For example, connecting member assembly 211*b* may include a first connecting rod 213*b* and a second connecting rod 216*b*. First connecting rod 213*b* may be operably connected (e.g., hinged or hinge-connected) with a crank of connecting member assembly 211*b* to define a first rotation axis 214*b*. Second connecting rod 216*b* may be operably connected (e.g., hinged or hinge-connected) with a linkage portion (e.g., similar to linkage portion 120) of stimulation member 110*b* to define a second rotation axis 217*b*. First rotation axis 214*b* may be substantially perpendicular to second rotation axis 217*b*. The crank of connecting member assembly 211*b* may drive rotation of first connecting rod 213*b* about first rotation axis 214*b* and rotation of second connecting rod 216*b* about second rotation axis 217*b*, thereby converting rotary motion of the motor (e.g., that may be similar to motor 220) of reciprocating assembly 200*b* into reciprocating motion for driving stimulation member 110*b*. In cases involving significant resistance during a use of the exemplary disclosed apparatus, connecting member assembly 211*b* may provide for the exemplary disclosed motor not to be blocked or jammed.

Figure 9:
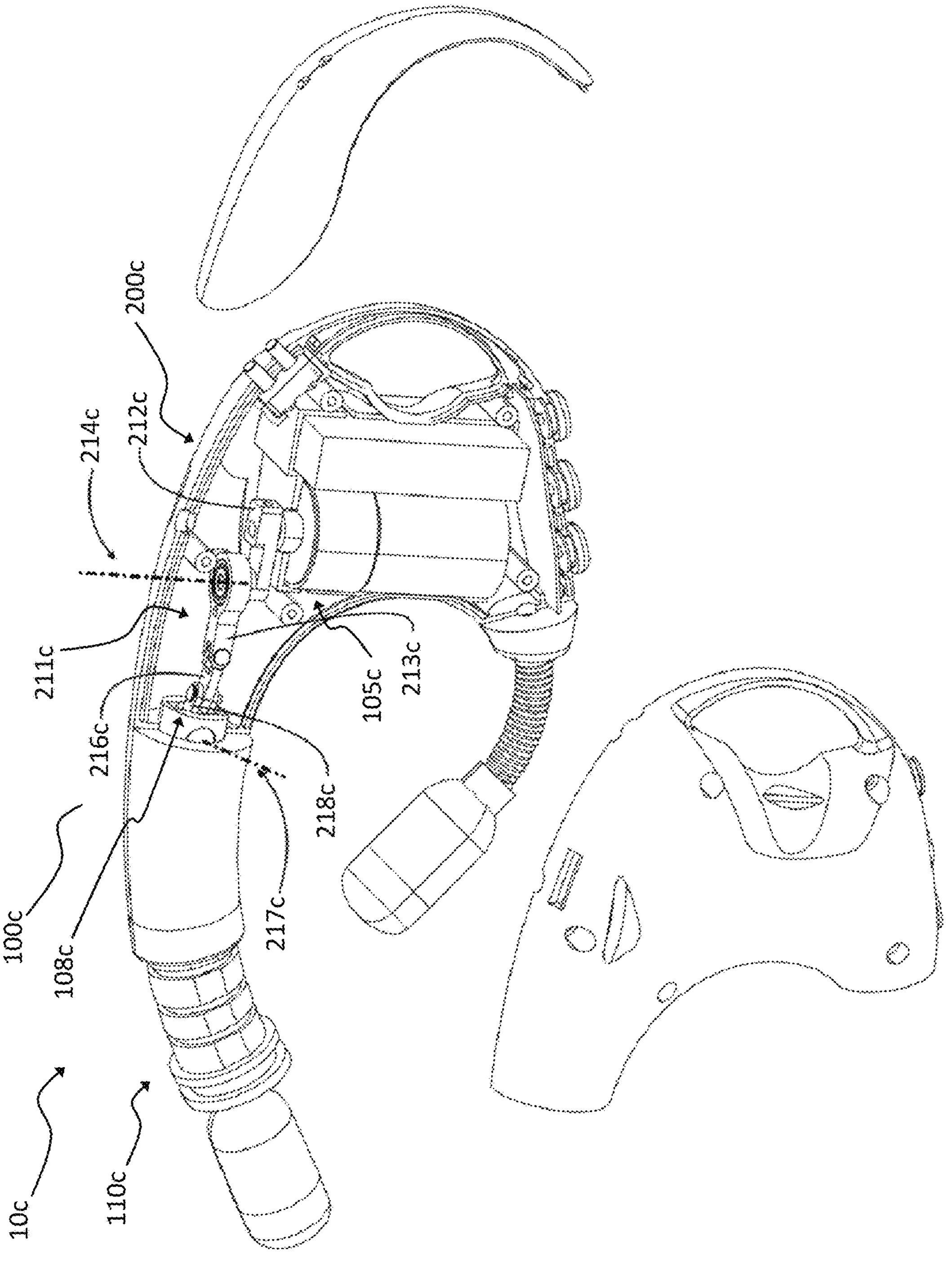
FIG. 9 is an exploded perspective illustration of another exemplary system of the present invention.
Figure 10:
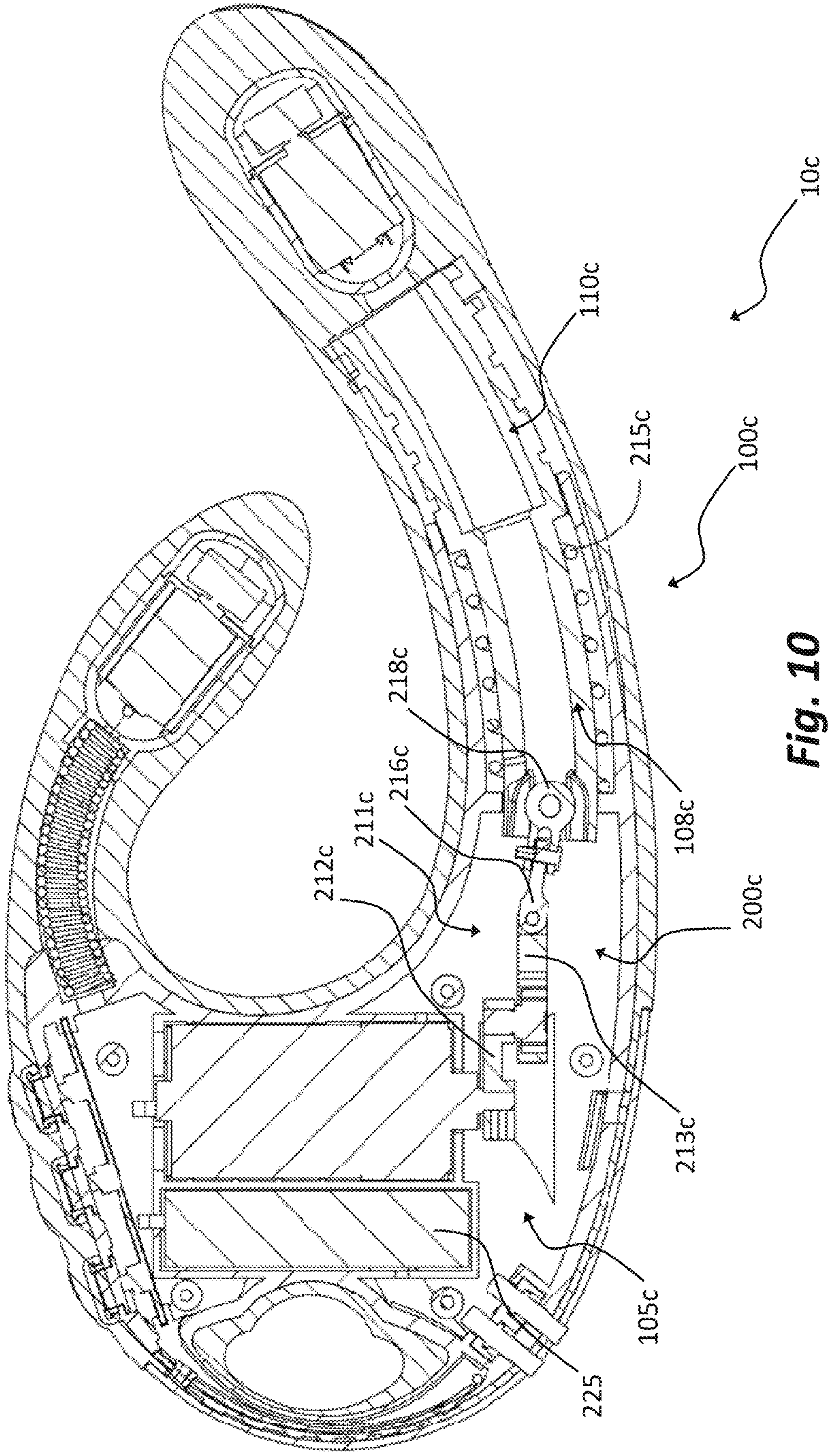
FIG. 10 is a sectional illustration of the exemplary system of FIG. 9.

FIGS. 9 and 10 illustrate another exemplary embodiment of the exemplary disclosed apparatus. An apparatus 10*c* may include a structural assembly 100*c* that may be generally similar to structural assembly 100 and a reciprocating assembly 200*c* that may be generally similar to reciprocating assembly 200. Structural assembly 100*c* may include a main body 105*c*, a guide member 108*c*, and a stimulation member 110*c* that may be generally similar to main body 105, guide member 108, and stimulation member 110, respectively. Reciprocating assembly 200*c* may include a connecting member assembly 211*c* that may include a plurality of multi-connecting rods (e.g., three connecting rods) and a rebound mechanism (e.g., including a coil 215*c*) that may be generally similar to rebound mechanism 215. Connecting member assembly 211*c* may include a first connecting rod 213*c*, a second connecting rod 216*c*, and a third connecting rod 218*c*. First connecting rod 213*c* may be operably connected (e.g., hinged or hinge-connected) with a crank 212*c* of connecting member assembly 211*c* to define a first rotation axis 214*c*. Second connecting rod 216*c* may be operably connected (e.g., hinged or hinge-connected) with third connecting rod 218*c*. Third connecting rod 218*c* may be operably connected (e.g., hinged or hinge-connected) with a linkage portion (e.g., similar to linkage portion 120) of stimulation member 110*c* to define a second rotation axis 217*c*. First rotation axis 214*c* may be substantially perpendicular to second rotation axis 217*c*. Crank 212*c* of connecting member assembly 211*c* may drive rotation of first connecting rod 213*c*, second connecting rod 216*c*, and third connecting rod 218*c* similarly to as described above regarding connecting member assembly 211*b*, thereby converting rotary motion of the motor (e.g., that may be similar to motor 220) of reciprocating assembly 200*c* into reciprocating motion for driving stimulation member 110*c*.

Figure 11:
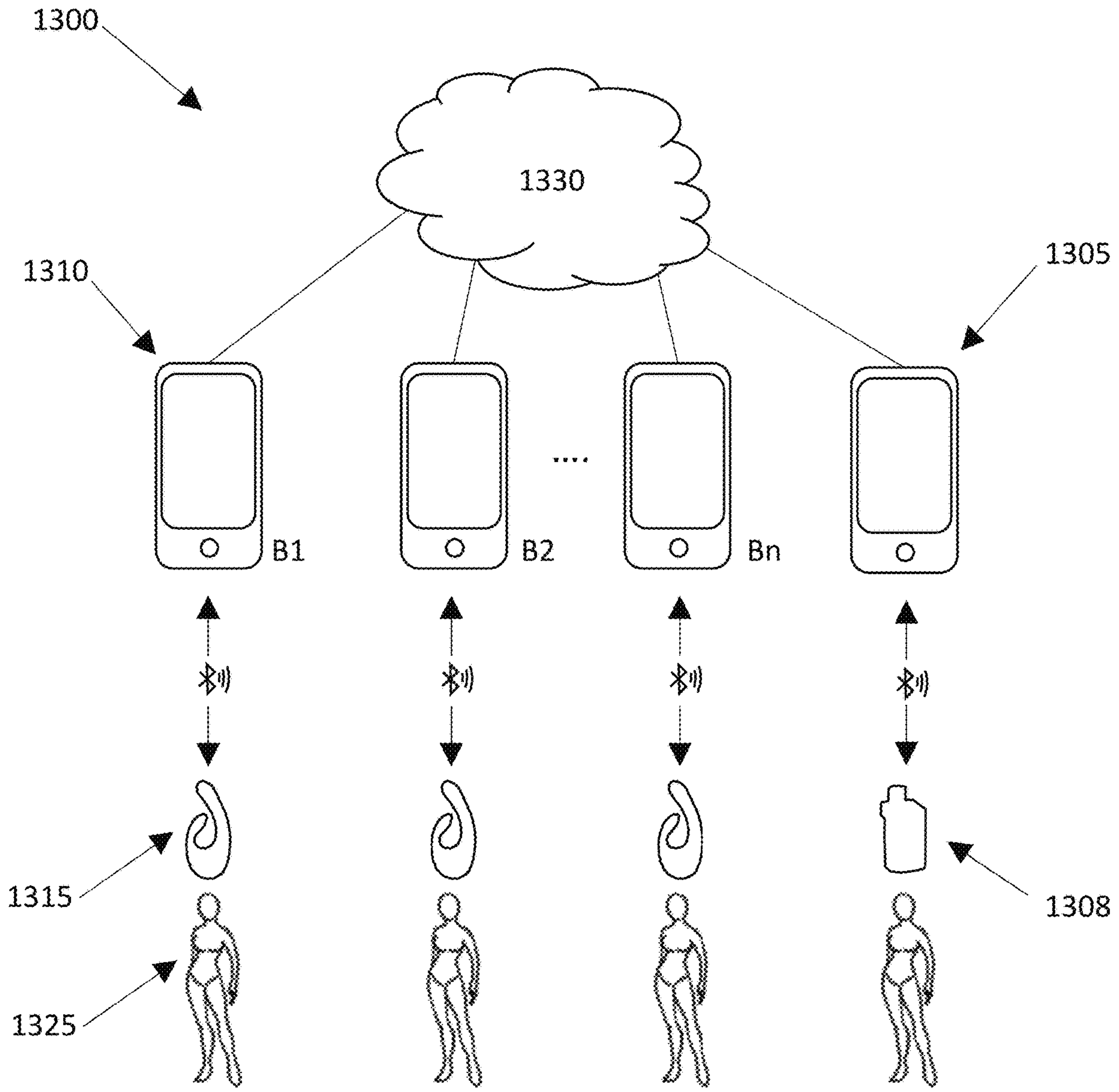
FIG. 11 is a schematic illustration of the exemplary disclosed system.

FIG. 11 illustrates an exemplary system 1300 for controlling one or more female accessories 1315 that may be similar to the exemplary disclosed sexual stimulation device (e.g., including apparatus 10, 10*a*, 10*b*, or 10*c*) described above and one or more male accessories that may also be similar to the exemplary disclosed sexual stimulation device (e.g., including apparatus 10, 10*a*, 10*b*, or 10*c*). For example, the exemplary disclosed adult toy having apparatus 10, 10*a*, 10*b*, or 10*c* may be included as female accessory 1315 and/or male accessory 1308 in system 1300. System 1300 may include one or more female user devices 1310, one or more female accessories 1315 (e.g., that may include an apparatus similar to apparatus 10, 10*a*, 10*b*, or 10*c* described above), one or more male user devices 1305, and/or one or more male accessories 1308 (e.g., that may include an apparatus similar to apparatus 10, 10*a*, 10*b*, or 10*c* described above, such as male accessories including male adult toys, for example, rings, strokers, vibrators, plugs, or any other suitable accessory). Female accessories 1315 and male accessories 1308 may be used by one or more users 1325 such as female and/or male users. Data such as image data, audio data, and/or control data may be transferred between male user devices 1305, male accessories 1308, female user devices 1310, and female accessories 1315.

System 1300 may include any desired number of female user devices 1310 (e.g., B1, B2, . . . . Bn) and/or similarly include any desired number of male user devices 1305. Female user device 1310 may be any suitable device for interfacing with other components of system 1300 such as a computing device (e.g., user interface). For example, female user device 1310 may be any suitable user interface for receiving input and/or providing output (e.g., image data) to user 1325. Female user device 1310 may include a camera and a microphone. Female user device 1310 may be, for example, a touchscreen device (e.g., of a smartphone, a tablet, a smartboard, and/or any suitable computer device), a wearable device, a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 1300, and/or any other suitable user interface. For example, female user device 1310 may include a touchscreen device of a smartphone or handheld tablet. For example, female user device 1310 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data. Any suitable application and/or web browser (e.g., for controlling female accessory 1315 that may include an apparatus similar to apparatus 10, 10*a*, 10*b*, or 10*c*, and/or male accessory 1308 may be similarly controlled) may be installed on female user device 1310 and utilized by user 1325.

Figure 12:
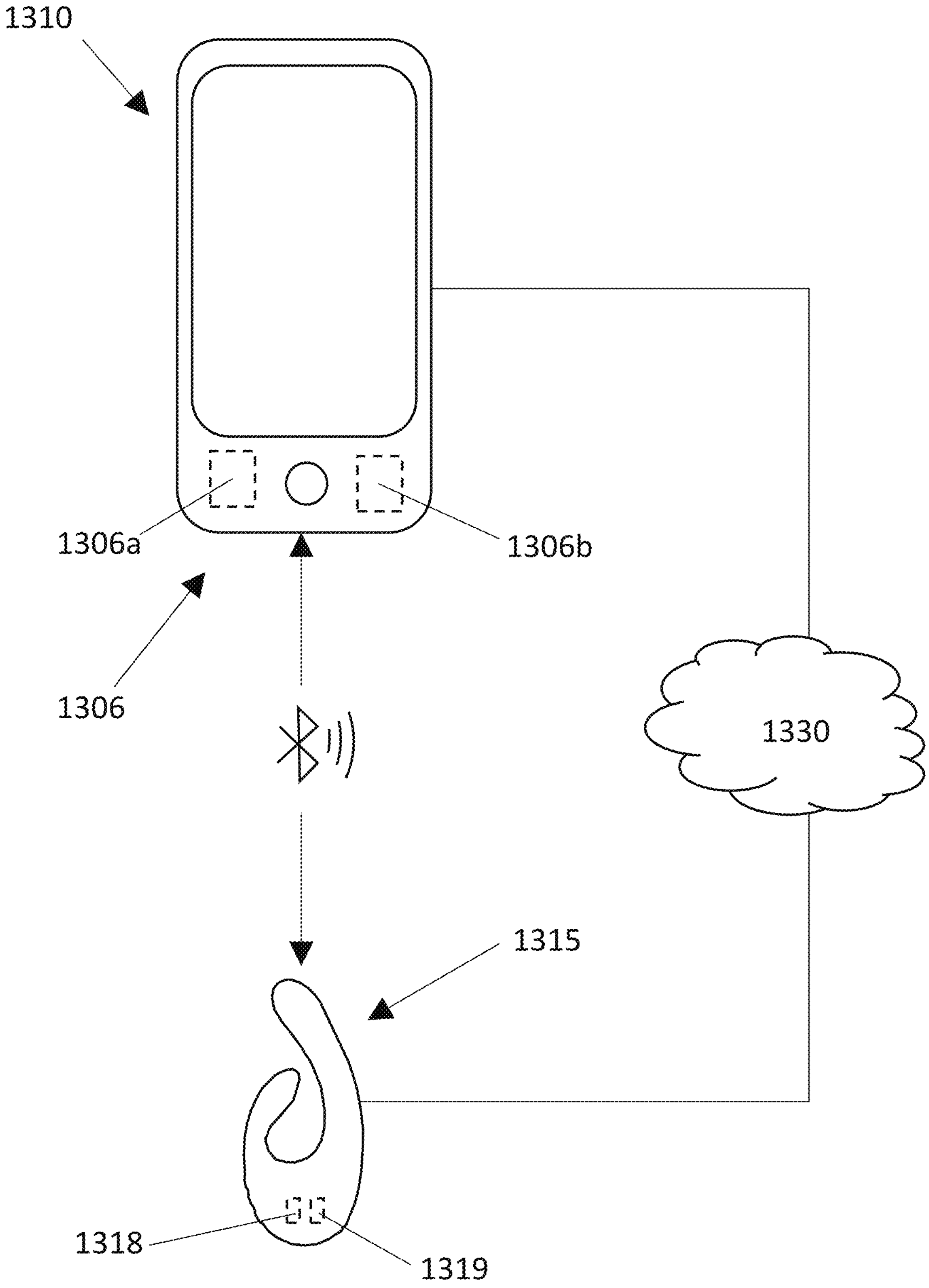
FIG. 12 is another schematic illustration of the exemplary disclosed system.

As illustrated in FIG. 12, female user device 1310 may include a sensor array 1306. Sensor array 1306 may sense data that may be transferred to and/or used in the operation of female accessory 1315 that may include an apparatus similar to apparatus 10, 10*a*, 10*b*, or 10*c* (e.g., and/or male accessory 1308 that may include an apparatus similar to apparatus 10, 10*a*, 10*b*, or 10*c*). In at least some exemplary embodiments, sensor array 1306 may include one or more sensors integrated or built into the exemplary disclosed user device such as, for example, a mobile phone, a pad, or a wearable device. Sensor array 1306 may include any suitable sensors for use with system 1300 such as, for example, a location sensor 1306*a* and a movement sensor 1306*b*. Location sensor 1306*a* may include a GPS device, a Galileo device, a GLONASS device, an IRNSS device, a BeiDou device, and/or any other suitable device that may operate with a global navigation system.

Movement sensor 1306*b* may include any suitable components for sensing motion (e.g., motion amplitude), velocity, and/or acceleration. Movement sensor 1306*b* may include an acceleration sensor. Movement sensor 1306*b* may include a gyroscope. For example, movement sensor 1306*b* may include a displacement sensor, a velocity sensor, and/or an accelerometer. For example, movement sensor 1306*b* may include components such as a servo accelerometer, a piezoelectric accelerometer, a potentiometric accelerometer, and/or a strain gauge accelerometer. Movement sensor 1306*b* may include a piezoelectric velocity sensor or any other suitable type of velocity or acceleration sensor.

Returning to FIG. 11, system 1300 may include any desired number of male user devices 1305. Male user device 1305 may be similar to female user device 1310. Any desired number of female user devices 1310 and/or male user devices 1305 may be operated by corresponding users 1325 (e.g., female users, male users, and/or any other users).

Returning to FIG. 12, female accessory 1315 may include a controller 1319 that may be any suitable computing device for controlling an operation of motors of female accessory 1315 and a communication device 1318. For example, controller 1319 and/or communication device 1318 may be provided in the exemplary disclosed adult toy having apparatus 10, 10*a*, 10*b*, or 10*c*. Controller 1319 may include for example a processor (e.g., micro-processing logic control device) or board components. Controller 1319 may control one or more motors based on input data and/or commands (e.g., control commands) received from female user device 1310 (e.g., and/or male user device 1305) via a network 1330 and/or communication device 1318 (e.g., transferred directly to communication device 1318 by any suitable component of system 1300). Motors (e.g., similar to motor 220) of female accessory 1315 may be controlled by controller 1319 to vibrate female accessory 1315 (e.g., an adult toy having apparatus 10, 10*a*, 10*b*, or 10*c*) at a desired level or strength, perform a suction operation at a desired level or strength using female accessory 1315 (e.g., using female accessory 1315 as a suction device), and/or cause female accessory 1315 to perform any other suitable action or function.

Network 1330 may be any suitable communication network over which data may be transferred between one or more female user devices 1310, one or more female accessories 1315, one or more male user devices 1305, and/or one or more male accessories 1308. Network 1330 may be the internet, a LAN (e.g., via Ethernet LAN), a WAN, a WiFi network, or any other suitable network. The components of system 1300 may also be directly connected (e.g., by wire, cable, USB connection, and/or any other suitable electromechanical connection) to each other and/or connected via network 1330. For example, components of system 1300 may wirelessly transmit data by any suitable technique such as, e.g., wirelessly transmitting data via 4G LTE networks (e.g., or 5G networks) or any other suitable data transmission technique for example via network communication. Female user devices 1310, female accessories 1315, male user devices 1305, and/or male accessories 1308 may include any suitable communication components for communicating with other components of system 1300 using for example the communication techniques described herein. For example, female user devices 1310 and male user devices 1305 may include integrally formed communication devices (e.g., smartphone components), and female accessories 1315 and male accessories 1308 may each include communication device 1318 that may communicate using any of the exemplary disclosed communication techniques.

In at least some exemplary embodiments, a given female accessory 1315 may communicate with a given female user device 1310 (e.g., a paired female user device 1310) via any suitable short distance communication technique. For example, female accessories 1315 (e.g., via communication device 1318) and female user devices 1310 may communicate via WiFi, Bluetooth, ZigBee, NFC, IrDA, and/or any other suitable short distance technique. Female accessory 1315 may be an adult toy that may be connected with female user device 1310 through short distance wireless communication. An application (e.g., operating using the exemplary disclosed modules) may be installed on female user device 1310, the application and female user device 1310 being configured to send commands to female accessory 1315 to drive (e.g., actuate) female accessory 1315. Male accessory 1308 may communicate with male user device 1305 similarly to the communication of female accessory 1315 and female user device 1310 described above.

System 1300 may include one or modules for performing the exemplary disclosed operations. The one or more modules may include an accessory control module for controlling female accessory 1315 and male accessory 1308. The one or more modules may be stored and operated by any suitable components of system 1300 (e.g., including processor components) such as, for example, network 1330, female user device 1310, female accessory 1315, male user device 1305, male accessory 1308, and/or any other suitable component of system 1300. For example, system 1300 may include one or more modules having computer-executable code stored in non-volatile memory. System 1300 may also include one or more storages (e.g., buffer storages). The exemplary disclosed buffer storage may be implemented in software and/or a fixed memory location in hardware of system 1300. The exemplary disclosed buffer storage (e.g., a data buffer) may store data temporarily during an operation of system 1300.

System 1300 may also include one or more imaging devices that may be any suitable imaging device such as a camera. For example, the exemplary disclosed imaging device may be any suitable video camera such as a digital video camera, a webcam, and/or any other suitable camera for recording visual data (e.g., recording a video or taking pictures) and/or image recognition. The exemplary disclosed imaging device may be a 3D camera, a headset that may be worn by a user, a spatial computing device (e.g., a spatial computer), a three-dimensional video sensor or camera, a camera of the exemplary disclosed user devices described above, a stereoscopic camera (e.g., and/or any other suitable device for stereo photography, stereo videography, and/or stereoscopic vision), and/or any other suitable type of imaging devices.

System 1300 may also include one or more wearable devices that may be any suitable device for allowing a user to control system 1300 based on user actions (e.g., movements and/or gestures). The exemplary disclosed wearable device may be any suitable motion detection device, a smart device (e.g., a smart wristband, smart glove, or one or more smart rings that may be worn by a user) and that may communicate with components of system 1300 via any of the exemplary disclosed communication techniques. The exemplary disclosed wearable device may include any suitable motion and/or position sensors that may communicate with the exemplary disclosed user devices or any other suitable component of system 1300. In at least some exemplary embodiments, the exemplary disclosed wearable device may be detected and/or tracked by the exemplary disclosed imaging device or may operate to sense user actions (e.g., gestures) without an imaging device.

The exemplary disclosed sexual stimulation device described above (e.g., female accessory 1315 and/or male accessory 1308 that may have an apparatus similar to apparatus 10, 10*a*, 10*b*, or 10*c* described above regarding FIGS. 1 through 10) may operate together with the above described components of system 1300. For example, the exemplary disclosed sexual stimulation device may operate in conjunction with one or more female user devices 1310, male user devices 1305, male accessories 1308, female accessories 1315, the exemplary disclosed modules, the exemplary disclosed imaging device, the exemplary disclosed wearable device, and/or any other suitable components.

The exemplary disclosed system, apparatus, and method may be used in any suitable application for providing sexual stimulation. The exemplary disclosed system, apparatus, and method may be used in any suitable application for providing an adult toy. For example, the exemplary disclosed system, apparatus, and method may be used in any suitable application for providing a female sex toy or a male sex toy. The exemplary disclosed system, apparatus, and method may be used in any suitable application for providing a reciprocating sex toy.

Figure 13:
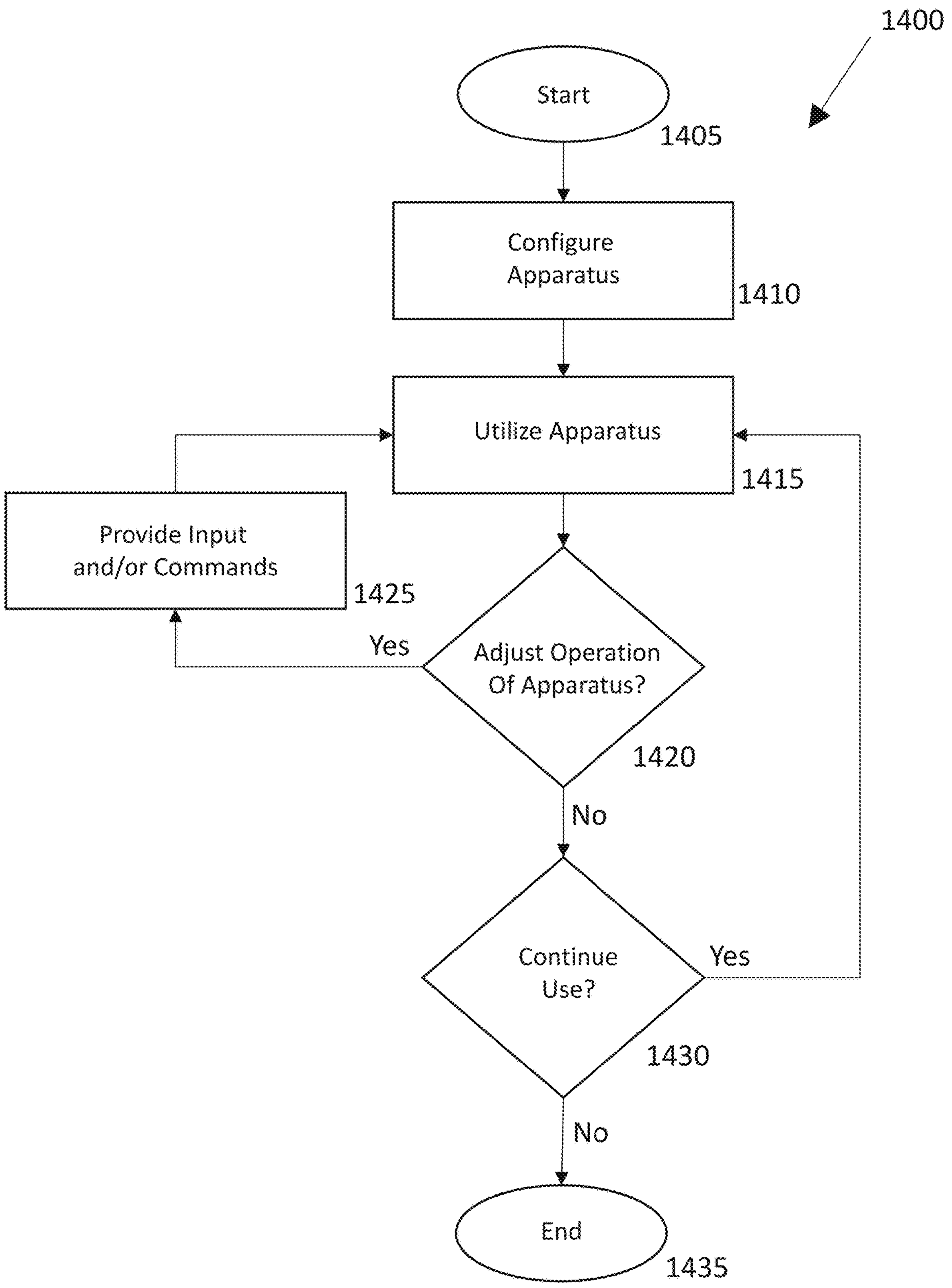
FIG. 13 is a flowchart showing an exemplary process for operation of the present invention.

FIG. 13 illustrates an exemplary process of using the exemplary disclosed system and apparatus. Process 1400 begins at step 1405. At step 1410, the exemplary disclosed apparatus (e.g., apparatus 10, 10*a*, 10*b*, or 10*c*) included in the exemplary disclosed adult toy (e.g., adult toy 50, male accessory 1308, or female accessory 1315) may be configured (e.g., by a user and/or based on operation of modules and/or predetermined operation of system 1300). For example, the exemplary disclosed apparatus may be configured to operate in conjunction with other exemplary disclosed adult toys (e.g., adult toy 50, male accessory 1308, or female accessory 1315), the exemplary disclosed modules, the exemplary disclosed imaging device, the exemplary disclosed wearable device, and/or any other suitable components (e.g., of system 1300).

At step 1415, a user (e.g., user 1325) may utilize the exemplary disclosed apparatus for example for sexual stimulation. The exemplary disclosed apparatus may provide reciprocating action in the exemplary disclosed adult toy for example as described below.

Apparatus 10 may operate to provide reciprocating action (e.g., of stimulation member 110 of structural assembly 100) based on an operation of reciprocating assembly 200. Motor 220 may operate to rotatably drive output shaft 220*a*, which may also rotatably drive eccentric wheel 230 based on output shaft 220*a* being received in shaft hole 230*a* of eccentric wheel 230. Eccentric wheel 230 may be eccentrically rotated about output shaft 220*a*, which may thereby actuate connecting member 210 based on first end portion 210*a* being attached to bearing 235 (e.g., wrapped around an outside lateral wall of bearing 235), which may be rotatably attached to eccentric wheel 230, as described above (e.g., bearing 235 may be rotatably attached to eccentric wheel 230, and/or first end portion 210*a* may be rotatable about bearing 235). Torque may be applied to connecting member 210 based on a rotation of eccentric wheel 230. Based on this actuation, first end portion 210*a* of connecting member 210 may be moved between a first position disposed relatively closer to guide member 108 as illustrated in FIG. 3, and a second position disposed relatively further from guide member 108 as illustrated in FIG. 4. The result may be a reciprocating action of connecting member 210 within the exemplary disclosed sleeve (e.g., guide member 108) as illustrated in FIGS. 3 and 4. Based on the attachment of connecting member 210 to stimulation member 110 as described above, stimulation member 110 may similarly be reciprocated between a first position (e.g., extended position) as illustrated in FIG. 3 and a second position (e.g., retracted position) as illustrated in FIG. 4 based on operation of motor 220.

When stimulation member 110 is in the second position (e.g., retracted position) illustrated in FIG. 4, rebound mechanism 215 (e.g., coil spring 215*a*) may be compressed, thereby storing potential energy. As motor 220 continues to eccentrically rotate eccentric wheel 230, first end portion 210*a* of connecting member 210 may move back toward guide member 108, which may cause rebound mechanism 215 (e.g., coil spring 215*a*) to extend (e.g., decompress) and thereby release potential energy. The release of potential energy (e.g., based on the resilience of coil spring 215*a*) may cause flexible connecting member 210 to rebound, thereby moving stimulation member 110 from the second position (e.g., retracted position) of FIG. 4 back to the first position (e.g., extended position) of FIG. 3. Based on the rebounding action, distal end portion 115 of stimulation member 110 may follow a curvy trajectory (e.g., curvilinear, curved, and/or irregularly rebounding trajectory). The curvy trajectory may for example include a variable acceleration and/or a variable trajectory (e.g., rebounding and/or bouncing) of distal end portion 115. Also based on the actuation and/or rebounding provided by reciprocating assembly 200, connecting member 210 and/or stimulation member 110 including distal end portion 115 may be rotated relative to main body 105 and guide member 108 (e.g., rotated within and/or relative to guide member 108). The exemplary disclosed motion may iteratively continue as apparatus 10 is reciprocated between the second position (e.g., retracted position) of FIG. 4 and the first position (e.g., extended position) of FIG. 3 based on operation of reciprocating assembly 200.

In at least some exemplary embodiments, an actuator (e.g., reciprocating assembly 200 including motor 220) may be configured to drive distal end portion 115 of stimulation member 110 to move from the first position (e.g., extended position) as illustrated in FIG. 3 disposed away from main body 105 to the second position (e.g., retracted position) relatively proximate (e.g., closer to) main body 105 as illustrated in FIG. 4. Rebound mechanism 215 may provide a rebounding action based on the resilience of coil spring 215*a* or repulsive force between magnetic components as described above. Rebound mechanism 215 may be configured to rebound distal end portion 115 from the second position (e.g., retracted position) of FIG. 4 to the first position (e.g., extended position) of FIG. 3, thereby causing distal end portion 115 to reciprocate in a curvy trajectory (e.g., curvilinear, curved, and/or irregular rebounding trajectory) between the second position and the first position (e.g., and between the first position and the second position). Also for example during the reciprocating and/or rebounding action, linkage portion 120 may rotate within the exemplary disclosed sleeve (e.g., guide member 108). Also for example, based on the rebounding action of rebound mechanism 215, stimulation member 110 may have a varying acceleration (e.g., different acceleration rates, for example different acceleration values) when moving in a first direction (e.g., defined by movement of distal end portion 115 of stimulation member 110 from the first position of FIG. 3 to the second position of FIG. 4) and a second direction (e.g., defined by movement of distal end portion 115 of stimulation member 110 from the second position of FIG. 4 to the first position of FIG. 3). For example, the rebounding action of rebound mechanism 215 may cause the acceleration in the first direction to be different from the acceleration in the second direction (e.g. the acceleration in the second direction may be greater than the acceleration in the first direction).

In at least some exemplary embodiments, flexible connecting member 210 may be alternately pulled and loosened (e.g., periodically pulled and loosened) as motor 220 rotates to drive eccentric wheel 230 so that coil spring 215*a* of rebound mechanism 215 alternates (e.g., periodically switches) between a compressed state as illustrated in FIG.

4 and an extended state as illustrated in FIG. 3. Motor 220 may rotatably drive eccentric wheel 230 to rotate through a 0 degree position and a 180 degree position as illustrated in FIGS. 3 and 4, thereby applying torque to flexible connecting member 210 via eccentric wheel 230 so that flexible connecting member 210 pulls distal end portion 115 of stimulation member 110 toward the second position (e.g., retracted position) of FIG. 4. Coil spring 215*a*, which may be compressed in the second position (e.g., retracted position) of FIG. 4, may be configured to release at least a portion of its stored elastic potential energy as eccentric wheel 230 rotates more than 180 degrees (e.g. rotates past the second position of FIG. 4), thereby causing distal end portion 115 of stimulation member 110 to spring back in the direction of the first position of FIG. 3. Also for example, coil spring 215*a*, which may be compressed in the second position (e.g., retracted position) of FIG. 4, may be configured to release at least a portion of its stored elastic potential energy as eccentric wheel 230 rotates more than 180 degrees (e.g. rotates past the second position of FIG. 4), and motor 220 may be configured to reduce a release of elastic potential energy from compressed coil spring 215*a* as a rotational speed of motor 220 may be increased, thereby adjusting a reciprocating motion stroke of stimulation member 110 (e.g., a movement of stimulation member 110 between the first and second positions). For example, adjusting a speed of motor 220 by the exemplary disclosed controller may adjust a reciprocating motion stroke of stimulation member 110.

Returning to FIGS. 6 and 7, apparatus 10*a* may operate to provide reciprocating action (e.g., of stimulation member 110*a* of structural assembly 100*a*) based on an operation of reciprocating assembly 200*a* similarly to as described above regarding an operation of apparatus 10. Stimulation member 110*a* may be actuated in a linear trajectory based on the configuration of guide member 108*a* and stimulation member 110*a* for example as described above. Rebound mechanism 216*a* may be configured to rebound the distal end portion of stimulation member 110*a* in the second direction from the second position (e.g., similar to FIG. 4) to the first position (e.g., similar to FIG. 3), thereby causing distal end portion 115 to reciprocate in a linear trajectory between the first position and the second position.

Returning to FIGS. 8 through 10, apparatus 10*b* and apparatus 10*c* may operate to provide reciprocating action (e.g., of respective stimulation members 110*b* and 110*c*) based on an operation of respective reciprocating assemblies 200*b* and 200*c* similarly to as described above regarding an operation of apparatus 10. An operation of respective connecting member assemblies 211*b* and 211*c* may provide generally similar conversion of rotary motion to reciprocating motion as described above regarding connecting member 210.

The exemplary disclosed adult toys (e.g., adult toy 50, male accessory 1308, or female accessory 1315) may be utilized by a user based on the exemplary disclosed operation described above regarding the exemplary disclosed apparatuses (e.g., apparatus 10, 10*a*, 10*b*, or 10*c*) included in the exemplary disclosed adult toys. Users may utilize the exemplary disclosed adult toys using the exemplary disclosed reciprocating action of the exemplary disclosed apparatuses with system 1300 as desired.

Returning to FIG. 13 at step 1420, it may be determined whether an operation of the exemplary disclosed apparatus is to be adjusted. If the operation is to be adjusted, process 1400 proceeds to step 1425.

At step 1425, operation may be adjusted by the user and/or the exemplary disclosed system. For example, the user may adjust operation of the exemplary disclosed apparatus via input provided to the apparatus via one or more input components (e.g., similar to one or more input components 60 such as buttons, dials, a touchscreen device, and/or any other suitable input components, for example as illustrated in FIGS. 5A and 5B). Returning to FIG. 13, operation of the exemplary disclosed apparatus may also be adjusted based on the exemplary disclosed modules and/or controllers described above. For example, system 1300 may automatically adjust an operation of apparatus 10 based on predetermined criteria such as a predetermined time period and/or tips or other criteria provided by the user (e.g., and/or other users of system 1300), algorithms of system 1300, and/or any other suitable criteria. Process 1400 may then return to step 1415 for further utilization. As many iterations as desired of steps 1415 through 1425 may be performed.

If it is determined at step 1420 that no adjustment is to be made, process 1400 proceeds to step 1430. At step 1430, it may be determined whether use is to be continued based on any suitable criteria such as, for example, input provided by the user via the one or more exemplary disclosed input components, control by system 1300 (e.g., similar to criteria described above regarding step 1525), and/or any other suitable criteria. If the operation is to be continued, process 1400 returns to step 1415 (e.g., or to step 1410 if the exemplary disclosed apparatus is to be reconfigured). As many iterations as desired of steps 1410 through 1430 may be performed. If use is not to be continued, process 1400 ends at step 1435.

The invention includes other illustrative embodiments ("Embodiments") as follows.

Embodiment 1: A curvilinear reciprocating device for sexual stimulation, comprising: a main body; a curved stimulation member, which is configured to stimulate an erogenous zone of a human body, including a proximal end portion and a distal end portion and wherein the proximal end portion is coupled to the main body; an actuator at least partially disposed within the main body and configured to actuate the distal end portion to move from a first position away from the main body to a second position that is closer to the main body than the first position; and a rebound mechanism configured to rebound the distal end portion from the second position to the first position, thereby causing the distal end portion to reciprocate in a curvy trajectory between the first position and the second position.

Embodiment 2: The curvilinear reciprocating device of Embodiment 1, further comprising a guide member configured to cause the curved stimulation member to reciprocate along an entirely curved axis.

Embodiment 3: The curvilinear reciprocating device of Embodiment 2, wherein: the guide member is a curved sleeve; and the stimulation member includes a curved linkage portion, the curved linkage portion being formed with a curvature corresponding to the curved sleeve; wherein the curved linkage portion is configured to be inserted into the curved sleeve.

Embodiment 4: The curvilinear reciprocating device of Embodiment 3, wherein the curved linkage portion is configured to pass through a coil spring of the rebound mechanism.

Embodiment 5: The curvilinear reciprocating device of Embodiment 3, wherein the curved linkage portion is configured to be operably rotated within the curved sleeve relative to the main body.

Embodiment 6: The curvilinear reciprocating device of Embodiment 1, wherein the actuator includes: a motor powered by a power source; an eccentric wheel having a shaft hole configured to connect to an output shaft of the motor; a bearing operably connected with the eccentric wheel; and a flexible connecting member having a first end and a second end, wherein the first end is configured to wrap around an outside lateral wall of the bearing, and wherein the second end is connected to the curved stimulation member; wherein the flexible connecting member is alternately pulled and loosened as the motor rotatably drives the eccentric wheel so that a coil spring of the rebound mechanism alternates between a compressed state and an extended state.

Embodiment 7: The curvilinear reciprocating device of Embodiment 6, wherein: the motor drives the eccentric wheel to rotate through a 0 degree position and a 180 degree position, thereby applying torque to the flexible connecting member via the eccentric wheel so that the flexible connecting member pulls the distal end portion of the stimulation member toward the second position to compress the coil spring; and the coil spring, when compressed, is configured to release at least a portion of elastic potential energy as the eccentric wheel rotates past the 180 degree position, thereby causing the distal end portion of the stimulation member to spring back in a direction toward the first position.

Embodiment 8: The curvilinear reciprocating device of Embodiment 6, wherein: the coil spring, when compressed, is configured to release at least a portion of elastic potential energy as the eccentric wheel rotates more than 180 degrees; and the motor is configured to reduce the release of elastic potential energy from the compressed coil spring as the rotational speed of the motor is increased, thereby adjusting a reciprocating motion stroke of the stimulation member.

Embodiment 9: The curvilinear reciprocating device of Embodiment 1, wherein the actuator includes: a motor; an eccentric wheel configured to connect to an output shaft of the motor; and a connecting member configured to operably couple the eccentric wheel and the stimulation member; wherein the connecting member is a flexible band or a plurality of multi-connecting rods.

Embodiment 10: The curvilinear reciprocating device of Embodiment 1, wherein the stimulation member is a curved dildo.

Embodiment 11: A reciprocating device for sexual stimulation comprising: a main body; a stimulation member, which is configured to stimulate an erogenous zone of a human body, including a proximal end portion and a distal end portion and wherein the proximal end portion is coupled to the main body; an actuator at least partially disposed within the main body and configured to actuate the distal end portion to move from a first position away from the main body to a second position that is closer to the main body than the first position; and a rebound mechanism configured to rebound the distal end portion from the second position to the first position, thereby causing the distal end portion to reciprocate in a linear trajectory between the first position and the second position.

Embodiment 12: The reciprocating device of Embodiment 11, wherein: the stimulation member has a different acceleration rate when moving in a first direction than in a second direction; the first direction is defined by movement of the distal end portion of the stimulation member from the first position to the second position; and the second direction defined by movement of the distal end portion of the stimulation member from the second position to the first position.

Embodiment 13: The reciprocating device of Embodiment 11, further comprising a sleeve connected to the main body; wherein the stimulation member includes a stimulation portion, which is the distal end portion, and a linkage portion having an outer diameter less than an inner diameter of the stimulation portion, the linkage portion being configured to be inserted into the sleeve after passing through a coil spring of the rebound mechanism.

Embodiment 14: The reciprocating device of Embodiment 13, wherein: the actuator includes a motor powered by a power source; and the motor is coupled to the linkage portion by a flexible connecting member passing through the sleeve.

Embodiment 15: The reciprocating device of Embodiment 11, wherein the stimulation member has at least one replaceable stimulation portion.

Embodiment 16: The reciprocating device of Embodiment 11, wherein the stimulation member is a curved dildo or a male masturbator.

Embodiment 17: A reciprocating device for sexual stimulation, comprising: a main body; a stimulation member, which is configured to stimulate an erogenous zone of a human body, including a proximal end portion and a distal end portion and wherein the proximal end portion is coupled to the main body by a connecting member; an actuator at least partially disposed within the main body and configured to actuate the distal end portion to move from a first position away from the main body to a second position that is closer to the main body than the first position; and a rebound mechanism configured to rebound the distal end portion from the second position to the first position, thereby causing the distal end portion to reciprocate in a curvy trajectory between the first position and the second position; wherein the actuator is configured to actuate the connecting member and the stimulation member in a first direction that is opposite to a second direction in which the rebound mechanism biases the stimulation member.

Embodiment 18: The reciprocating device of Embodiment 17, further comprising a guide member; wherein the guide member and the stimulation member are curvilinear; and wherein the guide member is configured to cause the curvilinear stimulation member to reciprocate along a curved trajectory.

Embodiment 19: The reciprocating device of Embodiment 17, further comprising a guide member; wherein the guide member and the stimulation member are linear; and wherein the guide member is configured to cause the linear stimulation member to reciprocate along a linear trajectory.

Embodiment 20: The reciprocating device of Embodiment 17, wherein the connecting member is a flexible band or a plurality of multi-connecting rods.

The exemplary disclosed system, apparatus, and method may provide an effective technique for providing effective stimulation to female or male genitalia. The exemplary disclosed system, apparatus, and method may provide an effective technique for providing reciprocal stimulation using an adult toy. For example, the exemplary disclosed system, apparatus, and method may provide for reciprocal stimulation of female or male genitalia using a curved sex toy. The exemplary disclosed system, apparatus, and method may also provide a technique for avoiding blocking or jamming of a motor driving a stimulating member of an adult toy when significant resistance is applied to the adult toy during use.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system, apparatus, and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A curvilinear reciprocating device for sexual stimulation, comprising:

a main body;

a curved stimulation member that includes a curved linkage portion, which is configured to stimulate an erogenous zone of a human body, including a proximal end portion and a distal end portion and wherein the proximal end portion is coupled to the main body;

an actuator at least partially disposed within the main body and configured to actuate the distal end portion to move from a first position away from the main body to a second position that is closer to the main body than the first position; and a curved guide member formed with a fixed curvature corresponding to the curved linkage portion, causing the curved stimulation member to reciprocate along a curved axis defined by the fixed curvature;

wherein the curved linkage portion is slidably coupled with the curved guide member, thereby defining the curved guide member and the curved linkage portion as a curved sliding pair in which the curved linkage portion is configured to move back and forth in sliding engagement with the curved guide member along the curved axis; and wherein the curved stimulation member including the curved linkage portion maintains the fixed curvature, defined from the distal end portion to the proximal end portion, as the distal end portion moves between the first position and the second position.

2. The curvilinear reciprocating device of claim 1, wherein the curved linkage portion is configured to be operably rotated within the curved guide member relative to the main body.

3. The curvilinear reciprocating device of claim 1, further comprising a rebound mechanism configured to rebound the distal end portion from the second position to the first position, thereby causing the distal end portion to reciprocate in a curvy trajectory along the curved axis between the first position and the second position.

4. The curvilinear reciprocating device of claim 3, wherein the actuator includes:

a motor powered by a power source;

an eccentric wheel having a shaft hole configured to connect to an output shaft of the motor;

a bearing operably connected with the eccentric wheel; and a flexible connecting member having a first end and a second end, wherein the first end is configured to wrap around an outside lateral wall of the bearing, and wherein the second end is connected to the curved stimulation member;

wherein the flexible connecting member is configured to be alternately pulled and loosened as the motor rotatably drives the eccentric wheel so that a coil spring of the rebound mechanism alternates between a compressed state and an extended state.

5. The curvilinear reciprocating device of claim 4, wherein:

the motor is configured to drive the eccentric wheel to rotate through a 0 degree position and a 180 degree position, thereby applying torque to the flexible connecting member via the eccentric wheel so that the flexible connecting member pulls the distal end portion of the curved stimulation member toward the second position to compress the coil spring; and the coil spring, when compressed, is configured to release at least a portion of elastic potential energy as the eccentric wheel rotates past the 180 degree position, thereby causing the distal end portion of the curved stimulation member to spring back in a direction toward the first position.

6. The curvilinear reciprocating device of claim 4, wherein:

the coil spring, when compressed, is configured to release at least a portion of elastic potential energy as the eccentric wheel rotates more than 180 degrees; and the motor is configured to reduce the release of elastic potential energy from the compressed coil spring as a rotational speed of the motor is increased, thereby adjusting a reciprocating motion stroke of the curved stimulation member.

7. The curvilinear reciprocating device of claim 1, wherein the actuator includes:

a motor;

an eccentric wheel configured to connect to an output shaft of the motor; and a connecting member configured to operably couple the eccentric wheel and the curved stimulation member;

wherein the connecting member is a flexible band or a plurality of multi-connecting rods.

8. The curvilinear reciprocating device of claim 1, wherein the curved stimulation member is a curved dildo.

9. The curvilinear reciprocating device of claim 1, wherein the curved guide member is formed as a curved sleeve.

10. The curvilinear reciprocating device of claim 9, wherein:

the curved linkage portion is configured to be inserted into the curved sleeve; and the fixed curvature of the curved sleeve corresponds to a curvature of the curved linkage portion.

11. The curvilinear reciprocating device of claim 1, wherein the curved linkage portion is configured to be reciprocatingly coupled with the actuator.

12. The curvilinear reciprocating device of claim 1, wherein the actuator includes:

a motor powered by a power source; and a connecting member having a first end and a second end, wherein the first end is configured to couple with the motor, and wherein the second end is configured to rotatably engage the curved linkage portion about a second rotation axis.

13. The curvilinear reciprocating device of claim 12, wherein the actuator further includes:

a crank having a shaft hole configured to receive an output shaft of the motor; and a connecting rod operably connected to the connecting member and the crank.

14. The curvilinear reciprocating device of claim 1, wherein the actuator is configured to be rotatably coupled with the curved linkage portion about a second rotation axis thereof.

15. A reciprocating device for sexual stimulation, comprising:

a main body;

a curved stimulation member, which is configured to stimulate an erogenous zone of a human body, including a proximal end portion and a distal end portion and wherein the proximal end portion is coupled to the main body by a connecting member;

an actuator at least partially disposed within the main body and configured to actuate the distal end portion to move from a first position away from the main body to a second position that is closer to the main body than the first position; and a guide member attached to the main body, wherein the guide member has a fixed curvature corresponding to the curved stimulation member, and is configured to movably receive the curved stimulation member such that the curved stimulation member reciprocates back and forth in sliding engagement within the guide member along a curved axis defined by the fixed curvature of the guide member.

16. The reciprocating device of claim 15, wherein the guide member and the curved stimulation member are both curvilinear; and wherein the guide member is configured to cause the curved stimulation member to reciprocate along a curved trajectory defined by the curved axis.

17. The reciprocating device of claim 15, wherein the connecting member is a flexible band or a plurality of multi-connecting rods.

18. The reciprocating device of claim 15, further comprising a rebound mechanism configured to rebound the distal end portion from the second position to the first position, thereby causing the distal end portion to reciprocate in a curvy trajectory defined by the curved axis between the first position and the second position, and wherein the actuator is configured to actuate the connecting member and the curved stimulation member in a first direction that is opposite to a second direction in which the rebound mechanism biases the curved stimulation member.

19. The curvilinear reciprocating device of claim 15, wherein the actuator includes:

a motor powered by a power source;

wherein the connecting member has a first end and a second end, wherein the first end is configured to couple with the motor, and wherein the second end is configured to rotatably engage a curved linkage portion of the curved stimulation member about a second rotation axis of the curved linkage portion.

20. The curvilinear reciprocating device of claim 19, wherein the actuator further includes:

a crank having a shaft hole configured to receive an output shaft of the motor, and a connecting rod operably connected to the connecting member and the crank.

21. The reciprocating device of claim 18, wherein the rebound mechanism is disposed on and about an exterior of the guide member.

* * * * *